(12) United States Patent
Hillen et al.

(10) Patent No.: US 10,588,262 B2
(45) Date of Patent: Mar. 17, 2020

(54) AUGER BED WITH MULTIPLE AUGERS IN A SINGLE TROUGH FOR A COMBINE HARVESTER

(71) Applicant: CNH Industrial America LLC, New Holand, PA (US)

(72) Inventors: Curtis F. Hillen, Lititz, PA (US); Herbert M. Farley, Elizabethtown, PA (US); Jonathan E. Ricketts, Coal Valley, IL (US)

(73) Assignee: CNH Industrial America LLC, New Holland, PA (US)

( * ) Notice: Subject to any disclaimer, the term of this patent is extended or adjusted under 35 U.S.C. 154(b) by 130 days.

(21) Appl. No.: 15/708,671

(22) Filed: Sep. 19, 2017

(65) Prior Publication Data

US 2019/0082604 A1 Mar. 21, 2019

(51) Int. Cl.
| | | |
|---|---|---|
| *A01F 12/46* | (2006.01) | |
| *A01D 41/12* | (2006.01) | |
| *A01F 12/44* | (2006.01) | |
| *A01F 7/06* | (2006.01) | |

(52) U.S. Cl.
CPC .............. *A01F 12/46* (2013.01); *A01D 41/12* (2013.01); *A01F 7/06* (2013.01); *A01F 12/44* (2013.01)

(58) Field of Classification Search
CPC . A01F 12/46; A01F 7/06; A01F 12/44; A01D 41/12; A01D 41/1217; A01D 75/282; A01D 61/008; A01D 61/004
See application file for complete search history.

(56) References Cited

U.S. PATENT DOCUMENTS

| | | | | |
|---|---|---|---|---|
| 3,300,032 | A | | 1/1967 | Dion |
| 3,373,871 | A | * | 3/1968 | Huether ................. A01F 12/442 209/284 |
| 3,589,111 | A | * | 6/1971 | Gullickson ............... A01F 7/06 56/12.8 |
| 3,593,719 | A | * | 7/1971 | Ashton .................... A01F 12/00 460/73 |
| 3,766,721 | A | * | 10/1973 | Linsmeier .............. A01D 45/02 198/625 |
| 3,940,911 | A | | 3/1976 | Schmitt |
| 4,087,953 | A | * | 5/1978 | Wilson ..................... A01F 12/10 56/14.6 |
| 4,282,703 | A | * | 8/1981 | Wilson ..................... A01F 12/10 56/14.6 |
| 4,461,306 | A | * | 7/1984 | De Busscher ........ A01F 12/184 460/104 |

(Continued)

FOREIGN PATENT DOCUMENTS

| | | | | |
|---|---|---|---|---|
| DE | 2504353 | A1 * | 8/1976 | ............. A01D 23/06 |
| DE | 4005187 | A1 | 8/1991 | |

(Continued)

OTHER PUBLICATIONS

Extended European Search Report for EP Application No. 18194321.8 dated Feb. 18, 2019 (6 pages).

*Primary Examiner* — Arpad Fabian-Kovacs
(74) *Attorney, Agent, or Firm* — Peter K. Zacharias; Patrick M. Sheldrake

(57) ABSTRACT

An auger bed for a threshing and separation system of an agricultural harvester includes a bed having a trough and two augers positioned in the trough for conveying material along the trough.

6 Claims, 5 Drawing Sheets

(56) References Cited

U.S. PATENT DOCUMENTS

| | | | | |
|---|---|---|---|---|
| 4,466,447 A | * | 8/1984 | Hoefer | A01F 12/52 460/13 |
| 4,499,908 A | * | 2/1985 | Niehaus | A01F 12/24 460/108 |
| 4,607,480 A | * | 8/1986 | Yarmashev | A01F 12/24 460/66 |
| 4,611,605 A | * | 9/1986 | Hall | A01F 7/06 460/80 |
| 4,716,908 A | * | 1/1988 | Helmes | A01F 12/00 460/69 |
| 4,976,654 A | * | 12/1990 | Dammann | A01F 7/06 460/80 |
| 5,367,860 A | * | 11/1994 | Cullen | A01F 25/183 100/100 |
| 5,913,803 A | * | 6/1999 | Moster | A01D 45/021 460/114 |
| 6,350,197 B1 | | 2/2002 | Cooksey et al. | |
| 7,040,980 B1 | | 5/2006 | Kestel | |
| 7,297,051 B1 | * | 11/2007 | Schmidt | A01F 12/00 460/66 |
| 7,632,183 B2 | * | 12/2009 | Schmidt | A01F 12/44 460/104 |
| 7,833,091 B2 | | 11/2010 | Holtmann et al. | |
| 8,118,649 B1 | * | 2/2012 | Murray | A01F 12/28 460/4 |
| 8,282,453 B1 | | 10/2012 | Hillen et al. | |
| 8,777,706 B2 | * | 7/2014 | Farley | A01D 75/282 460/101 |
| 8,821,229 B2 | * | 9/2014 | Stan | A01F 12/444 460/99 |
| 8,858,310 B2 | * | 10/2014 | Cooksey | A01F 12/46 460/103 |
| 2006/0287020 A1 | | 12/2006 | Muhr | |
| 2009/0215510 A1 | * | 8/2009 | Schmidt | A01F 12/44 460/109 |
| 2009/0280877 A1 | * | 11/2009 | Holtmann | A01D 41/12 460/101 |
| 2012/0237325 A1 | * | 9/2012 | Flickinger | A01D 41/1217 414/502 |
| 2013/0158813 A1 | * | 6/2013 | McCully | A01D 41/1217 701/50 |
| 2013/0165191 A1 | * | 6/2013 | Farley | A01D 75/282 460/1 |
| 2015/0156968 A1 | * | 6/2015 | Lauwers | A01D 57/00 56/10.2 R |
| 2016/0135371 A1 | | 5/2016 | Vandevelde et al. | |
| 2016/0278293 A1 | | 9/2016 | Temple et al. | |

FOREIGN PATENT DOCUMENTS

| | | |
|---|---|---|
| DE | 102008023005 A1 | 11/2009 |
| EP | 2425703 A1 | 3/2012 |

* cited by examiner

AUGER BED WITH MULTIPLE AUGERS IN A SINGLE TROUGH FOR A COMBINE HARVESTER

FIELD OF THE INVENTION

The present invention relates to an auger for a combine harvester.

BACKGROUND OF THE INVENTION

As described in U.S. Pat. No. 8,282,453 to CNH America LLC, which is incorporated by reference herein in its entirety, a combine harvester is a machine that is used to gather, thresh, and clean a wide range of grain crops while returning the straw, chaff and material other than grain (MOG) back to the earth in a single pass over the field. Typically, a combine harvester gathers the crop from the field with a header and transports the crop by means of a feeder house to a threshing and separating device located inside the combine. Generally, threshing refers to removing grain, beans, seeds or kernels, hereinafter referred to as just grain, which are desired to be collected, from husks, cobs, pods, stems, straw, and other portions of the plants being harvested, which are to be discarded.

Referring now to the prior art figures, FIG. 1 shows an agricultural combine 10 according to the prior art. The combine 10 includes a longitudinally axially arranged threshing and separation system 14 of well-known construction and operation.

As shown, threshing and separation system 14 is axially arranged, in that it includes a cylindrical threshing rotor 12 conventionally supported and rotatable in a predetermined direction about a rotational axis there through for conveying a flow of crop material in a helical flow path through a threshing chamber 16 extending circumferentially around the rotor 12. As shown, concaves 18 extend circumferentially around the rotor 12 and the flew of crop passes in the space between the spinning rotor and the concaves. As the crop material flows through the threshing and separation system 14, the crop material including, for example, gram, straw, legumes, and the like, will be loosened and separated from crop residue or waste such as, for example, husks, cobs, pods, and the like, and the separated materials may be carried away from the threshing and separation system 14 in a well-known conventional manner. As threshed crop falls through the grates in concaves 8 and other grates, it is moved by a conveyor system to a grain bed in a cleaning system, as is described hereinafter.

FIG. 2 shows a more detailed figure of grain movement from thresher rotor 12 to the auger bed 70 and then to the grain bed 22 of the cleaning system 20. The threshed crop follow paths 102. Grain and MOG falling through the grates in the concave area 18, lands on the auger bed 70 or a grain pan 76. Grain pan 76 is used in conjunction with a sloping overhead return pan 84 that prevents falling threshed crop from directly impacting the grain bed 22 in cleaning system 20.

The auger bed 70 comprises a series of parallel augers 72 that are each positioned in a separate trough 73. Five parallel augers 72 oriented from the front to back of the combine rotate in parallel troughs 73 to move grain and MOG onto grain pan 76. After passing grain pan 76, threshed crop is moved on to grain bed 22. Once on the grain bed 22, the upper sieve 26 reciprocates to move crop material backwards along the length of the grain bed 22 in direction 100 to separate out the grain. The heavy crop matter instead exits the rear of the grain bed in direction 106.

Additional conveyance capacity of the auger bed 70 is sought as the capacity of modern harvesters increase. However, the processing capacity of the auger bed 70 is finite. Simply increasing the rotating speed of the auger can damage the grain and can also have negative effects on cleaning system performance. It is not possible to simply increase the width of the auger bed 70 or the diameter of the augers 72 within the bed 70 due to vehicle size constraints and without affecting the position of other functional components of the harvester.

What is sought is a way to increase conveyance capacity of an auger bed without increasing the rotating speed of the augers or increasing the width or ceiling height of the auger bed.

SUMMARY OF THE INVENTION

According to one aspect of the invention, an auger bed for a conveyor of an agricultural harvester comprises a bed comprising a trough for accommodating two augers, the trough comprising two side walls and a lower wall directly interconnecting the two side walls, wherein the lower wall is positioned to extend beneath both of the two augers.

According to another aspect of the invention, an agricultural harvester comprises a cylindrical threshing rotor and an auger bed positioned directly beneath the rotor for receiving threshed grain and MOG therefrom. The auger bed comprises two augers mounted in a trough of a bed. The trough comprises two side walls and a lower wall interconnecting the two side walls. The two augers are positioned above the lower wall and between the two side walls, wherein longitudinal axes of the at least two augers are positioned along a curve.

According to yet another aspect of the invention, an auger bed for a conveyor of an agricultural harvester comprises two augers mounted in a trough of a bed. The trough comprises two side walls, a lower wall interconnecting the two side walls and a protruding portion. The protruding portion is positioned between the augers. The augers are positioned above the lower wall and between the two side walls.

BRIEF DESCRIPTION OF THE DRAWINGS

For the purpose of illustration, there are shown in the drawings certain embodiments of the present invention. It should be understood, however, that the invention is not limited to the precise components, arrangements, dimensions, and instruments shown. Like numerals indicate like elements throughout the drawings. In the drawings.

DETAILED DESCRIPTION OF THE INVENTION

In general, aspects of the present invention relate to a work vehicle, particularly agricultural work vehicles such as a combine harvester. It should be appreciated, however, that the invention is not limited to a combine, or any other particular type of work vehicle. Aspects of the invention are described herein with reference to a combine for illustrative purposes only.

Figure 1:
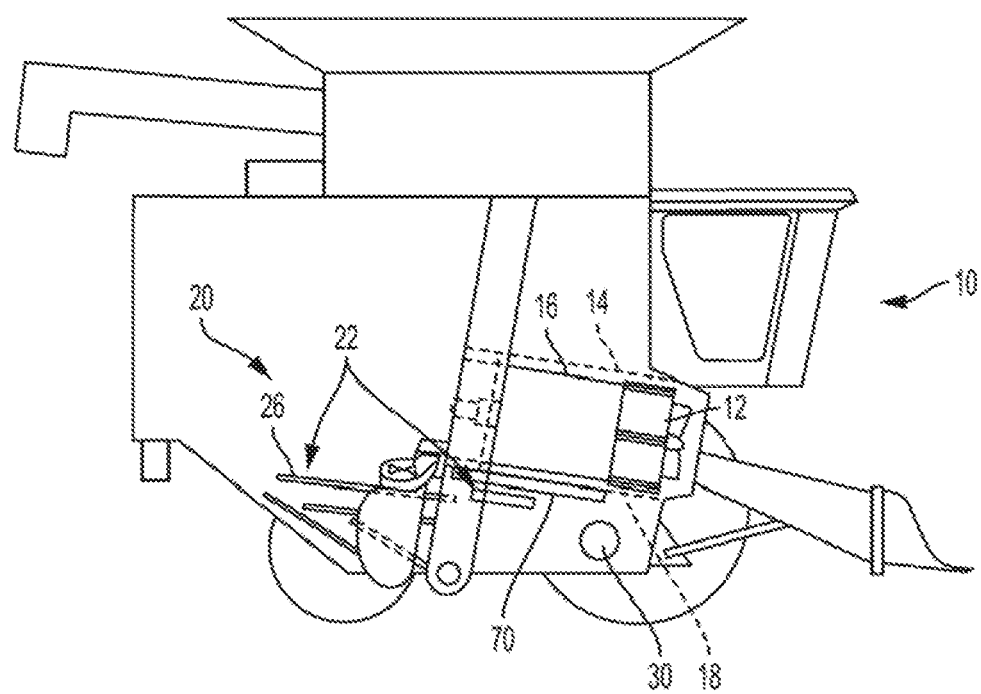
FIG. 1 is a side view of a harvester according to the prior art.
Figure 3:
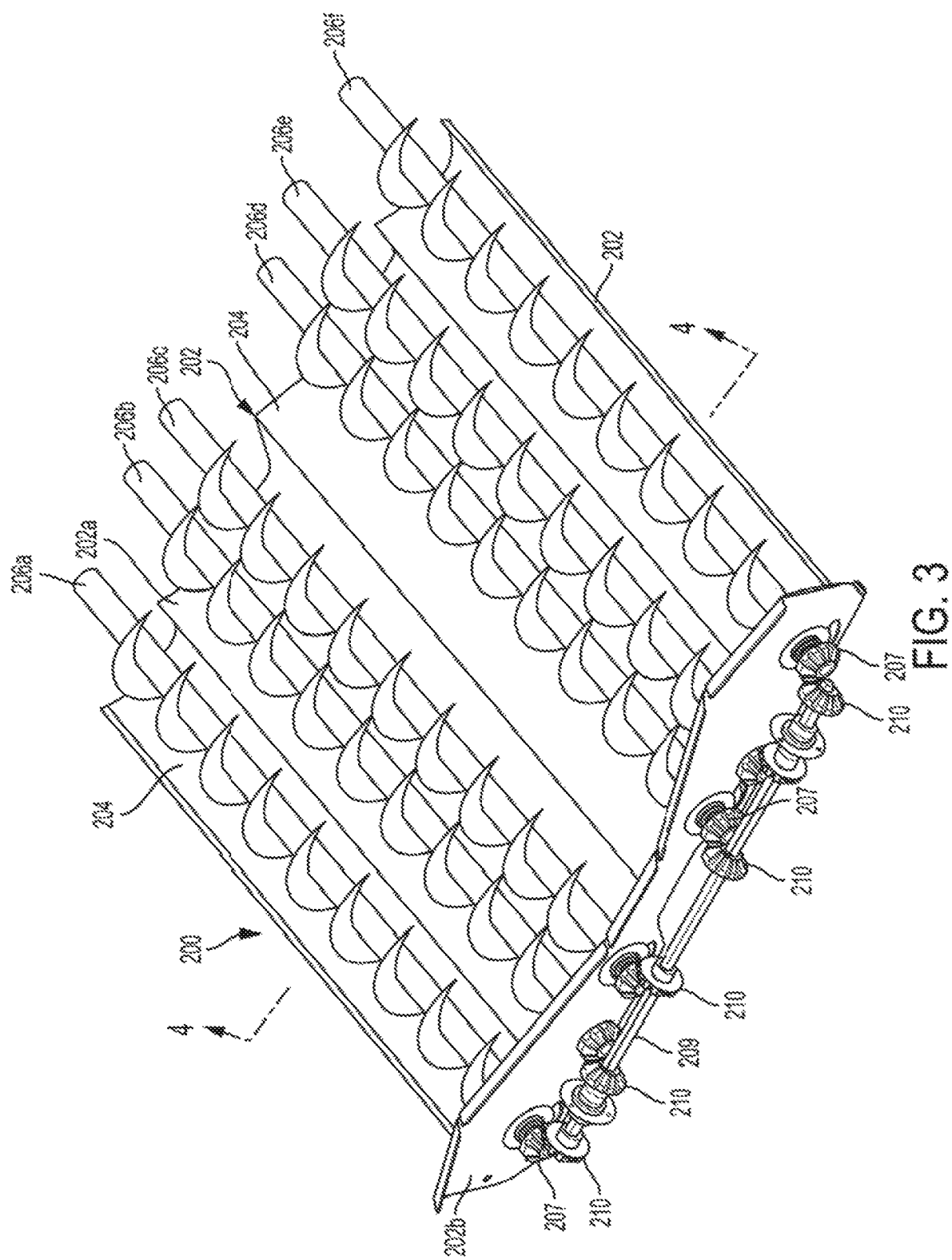
FIG. 3 is a perspective view of an auger bed according to the instant invention.
Figure 4:
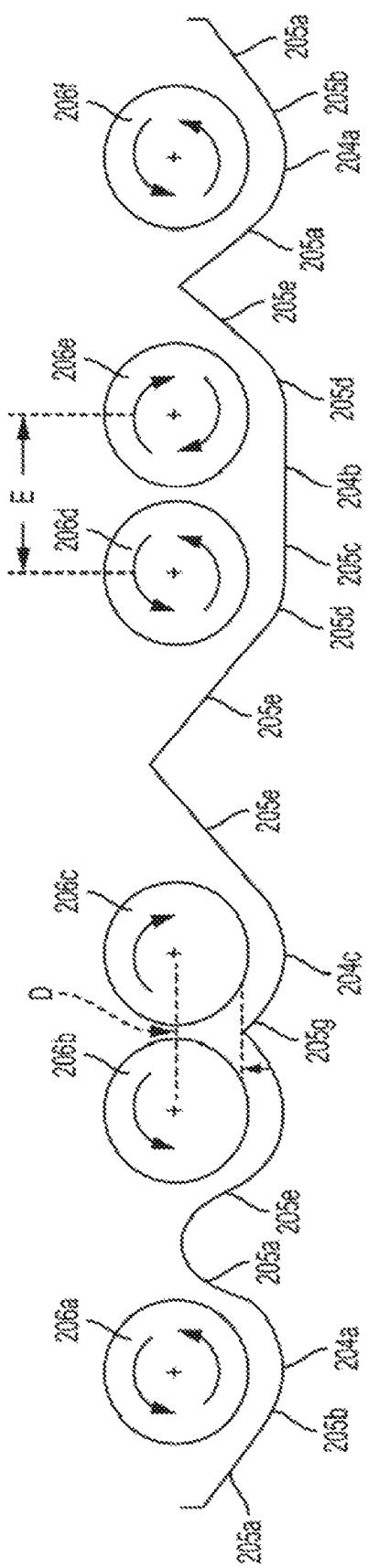
FIG. 4 is a cross-sectional view of the auger bed of FIG. 3 taken along the lines 4-4.

Referring now to the drawings, wherein like numbers refer to generally like items or features, FIGS. 3 and 4 depict an auger bed 200. The auger bed 200 is configured for use with the prior art combine harvester 10 of FIG. 1 and as a replacement for the auger bed 70 of that combine harvester.

Figure 2:
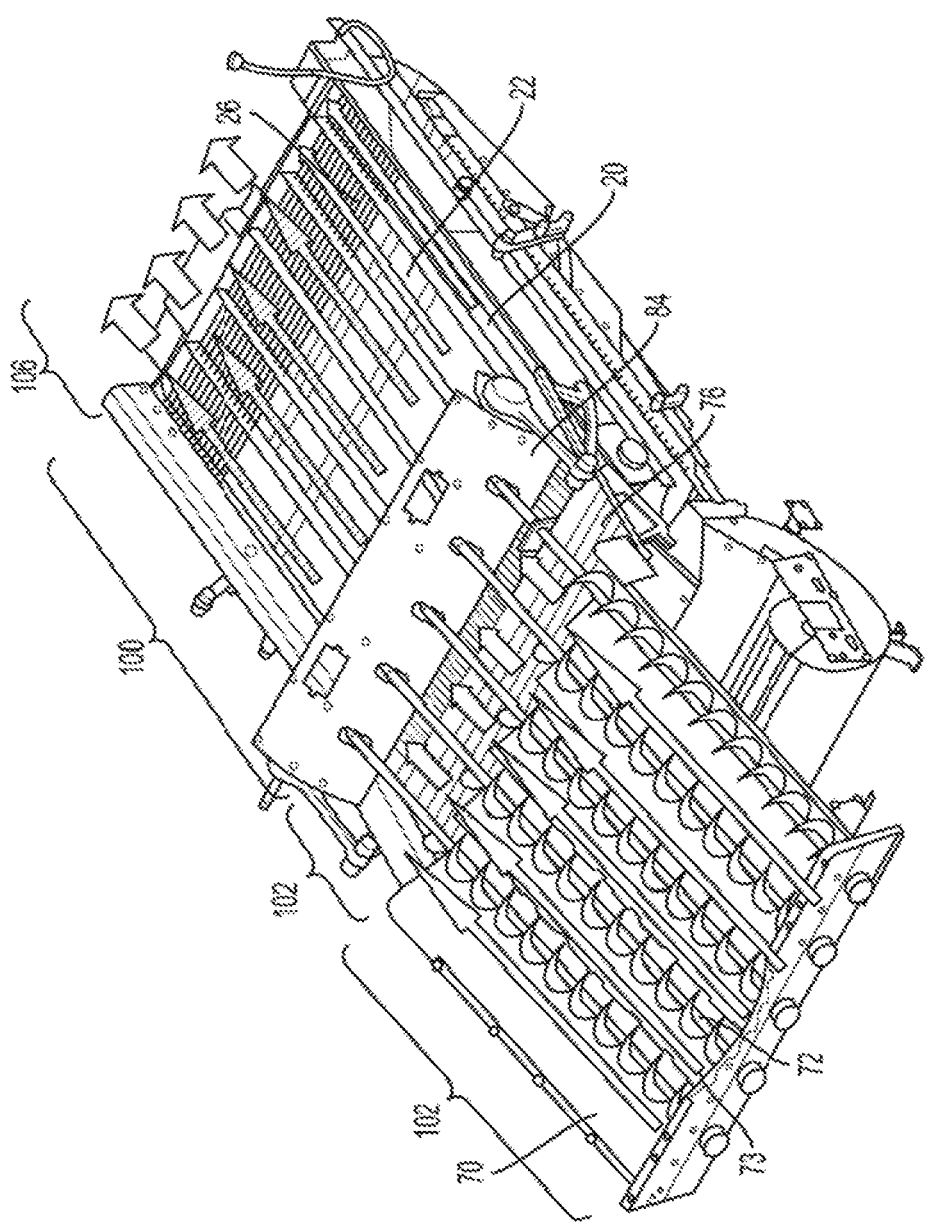
FIG. 2 is a perspective view of a conveyer and cleaning system of the prior art harvester of FIG. 1 showing flow of material.
Figure 5:
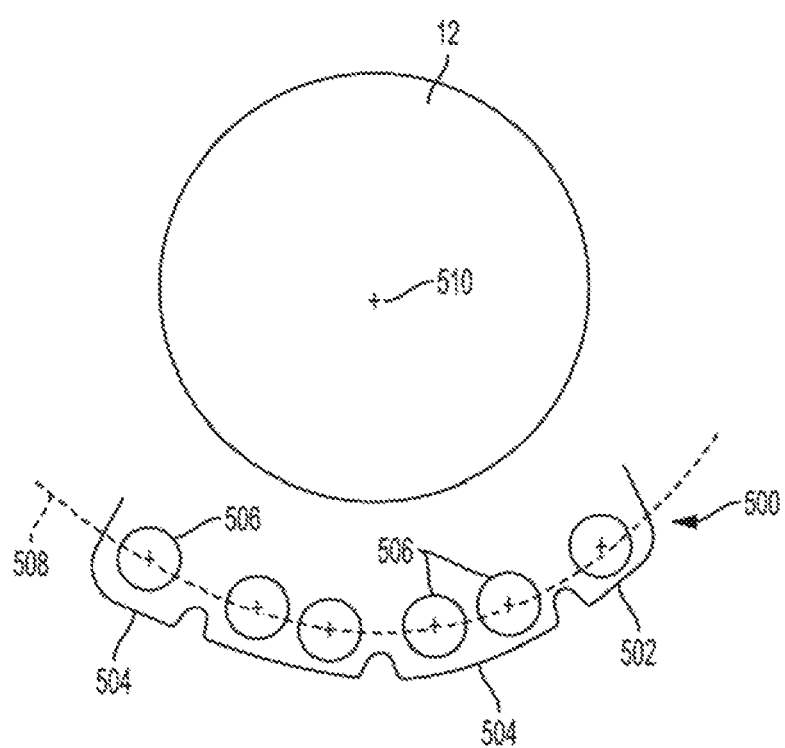
FIG. 5 is a cross-sectional view of another auger bed according to the instant invention, which is shown in relation to a threshing rotor.

The auger bed 200 includes a bed 202 having a plurality of troughs 204. Six augers 206a-206f (referred, to either individually or collectively as auger(s) 206) are positioned in troughs 204. It will be understood that the number of augers may vary. Longitudinal axes (i.e., axes of rotation) of the augers 206 are positioned on the same plane. The axes of the augers 206 are positioned in parallel and are oriented from the front to back of the combine to move threshed grain and MOG onto grain pan 76 of FIG. 2, like the augers 72 of FIG. 2. Alternatively, the longitudinal axes may not be co-planar, as shown in FIG. 5.

The auger bed 230 includes an auger drive which comprises gears 207, rotatable shaft 209, and gears 210. A gear 207 is fixed at the front end of each auger 206. The gear end of each auger 206 is positioned through a hole in the wall 202b of the bed 202. A rotatable shaft 209 is mounted either directly or indirectly to the auger bed 200 for rotating the augers 206. More particularly, a plurality of gears 210 are fixedly mounted to the shaft 209 such that the gears 210 rotate along with the shaft 209. Each gear 210 is meshed with a respective gear 207 of one of the augers 206. In operation, rotation of the shaft 209 causes simultaneous rotation of all of the augers 206 by virtue of the geared connection between each pair of meshed gears 210 and 207. Another gear shaft (not shown) of the combine provides input power to the shaft 209.

Although the auger drive is shown at the front end 202b of the bed 202, it should be understood that the auger drive could be positioned at or near the rear end 202a of the bed 202. Additionally, auger drive arrangements other than the cross-shaft and bevel gear sets shown in FIG. 3 could be used. For example, the auger drive could comprise a roller chain arrangement or a serpentine/synchronous belt arrangement.

As best shown in FIG. 4, the bed 202 is formed from one or more walls, which may be composed of steel sheet metal, for example. The walls are formed to define a plurality of troughs 204a-204c (referred to collectively as troughs 204). The bed 202 shown in FIGS. 3 and 4 includes four troughs 204. Each trough 204 accommodates one or more augers 206. For the purpose of comparison, the bed 202 is shown as including at least three different types of troughs 204a, 204b and 204c. The bed 202 may include any combination of the troughs 204, such as two troughs 204b and two troughs 204a; two troughs 204c and two troughs 204a; four troughs 204b; or, four troughs 204c. The troughs 204 are oriented in a parallel fashion with respect to one another. Adjacent side walls of the troughs 204 are interconnected.

The trough 204a, which is sized to accommodate a single auger 206a, is a typical trough that can be found in a conventional auger bed. The troughs 204a are positioned on opposite sides of the bed 202 and are structurally and functionally equivalent. Each trough 204a includes semicircular rounded surface 205b and sides 205a extending from each end of the surface 205b. The sides 205a may be either straight or curved. In operation, the auger 206a rotates in the direction of the arrows shown in FIG. 4. The grain or other material churned by auger 206a becomes wedged against the sides 205a of the trough 204a and is led from the front end 202b of the bed 202 to the rear end 202a of the bed 202 by the flights of the auger 206a.

The trough 204b is sized to accommodate two augers 206d and 206e. The trough 204b includes a series of interconnected surfaces facing the augers 206d and 206e. The series of interconnected surfaces include a flat base 205c, a rounded surface 205d that extends upward from each end of the flat base 205c, and a straight surface 205e that extends upward from a top end of each rounded surface 205d. In other words, each rounded surface 205d interconnects a straight surface 205e and the flat base 205c. The straight surface 205e could be straight, as shown, or slightly curved. The straight surfaces 205e rise to an elevation above longitudinal axes of the augers 206d and 206e. The end of the straight surfaces 205e extend to an elevation beneath the top of the augers 206d and 206e. Although the surfaces 205a and 205e are shown as extending to an elevation above the longitudinal axes of the augers, the surfaces 205a and 205e could extend to an elevation beneath the longitudinal axes of the augers.

In operation, the auger 206d rotates in the clockwise direction, whereas the auger 206e rotates in a counterclockwise direction, i.e., opposite to the direction of the auger 206d, as depicted by the arrows shown in FIG. 4. The threshed material churned by auger 206d wedges against the left side 205e of the trough 204b, and the threshed material churned by auger 206d wedges against the opposite right side 205e of the trough 204b. The threshed material streams combine in the space between augers 206d and 206e, and the threshed material streams wedge together and are directed by the flightings of the augers in a direction toward the rear end 202a of the bed 202. This process is continuously repeated as the threshed material is led from the front end 202b of the bed 202 to the rear end 202a of the bed 202 by the rotational motion of the augers 206d and 206e.

The trough 204c is also sized to accommodate two augers 206b and 206c. The trough 204c is substantially similar to the trough 204b, with the exception that the base wall of the trough 204c includes a V-shaped protruding wall 205g. The wall 205g is positioned equidistant from the longitudinal axes of the augers 206b and 206c. One exterior facing side of the wall 205g faces the auger 206b, and the other exterior facing side of the wall 205g faces the auger 206c. The terminal end of the wall 205g rises to an elevation beneath the longitudinal axes of the augers 206b and 206c by a distance 'D'.

In operation, the auger 206b rotates in the clockwise direction, whereas the auger 206c rotates in a counterclockwise direction. The threshed material churned by auger 206b wedges against the left side 205e of the trough 204c, and then the threshed material travels around the auger 206b and wedges against the side of the wall 205g that faces the auger 206b. At the same time, the threshed material churned by auger 206c wedges against the opposite right side 205e of the trough 204c, and then the threshed material travels around the fighting of the auger 206c and wedges against the side of the wall 205g that faces the auger 206c. The streams of threshed material may combine as they pass over the wall 205g, or the streams of threshed material may remain separate. This process is continuously repeated as the threshed material is led from the front end 202b of the bed 202 to the rear end 202a of the bed 202 by the rotational motion of the augers 206b and 206c.

By positioning two augers 206 in a single trough 204, the auger bed can accommodate a larger number of augers in the auger bed because less walls are required in the auger bed for separating adjacent augers. Increasing the number of augers results in an increase in the conveyance capacity of an auger bed, without increasing either the rotational speed of the augers or the overall dimensions of the auger bed. The problems associated with increasing the rotational speed of the augers and/or the overall dimensions of the auger bed are described in the Background section. Also, positioning the augers close together increases the amount of live surfaces per given area in which threshed material is conveyed by the auger bed.

The augers 205b/c and 206d/e in troughs 204c and 204b, respectively, may be rotated in the reverse directions from that which is shown in FIG. 4. Operating those augers in the reverse direction would cause the augers to compress one wedge of material against an adjacent wedge of material. Moving material from one auger against material from the other auger may increase conveyance through the auger bed 200. As another alternative, the augers 206b/c and 206d/e in troughs 204c and 204b, respectively, may be rotated in same rotational direction.

The distance 'E' between the longitudinal axes of the adjacent augers 206b/206c and 206d/206e, which are positioned in the same troughs 204c and 204b, respectively, is greater than an outer diameter of the augers 206. Alternatively, the distance 'E' may be equal to an outer diameter of the augers 206. As another alternative, and although not shown, the distance 'E' may be less than an outer diameter of the augers 206, such that the adjacent augers in the same trough are intermeshed. The longitudinal axes are shown in FIG. 4.

FIG. 5 depicts another exemplary embodiment of an auger bed 500. The auger bed 500 is substantially similar to the auger bed 200 and only the differences between those auger beds will be described. The bed 502, which comprises a plurality of troughs 504, has a curved shape that follows the outer curvature of the threshing rotor 12. The longitudinal axes of the augers 506 mounted to the bed 502 are aligned along a curve 508. The central axis of the curve 508 is either aligned with or adjacent to the longitudinal axis 510 of the threshing rotor 12. Stated differently, the central axis of the curve 508 is within the perimeter of the threshing rotor 12.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An agricultural harvester comprising:
   a cylindrical threshing rotor;
   at least two augers; and
   an auger bed positioned beneath the rotor for receiving grain or other material therefrom, the auger bed comprising a trough for accommodating the at least two augers, the trough comprising two side walls and a lower wall directly interconnecting and extending between the two side walls, wherein the at least two augers are positioned in the trough at a location above the lower wall and between the two side walls, and wherein the lower wall is positioned to extend beneath both of the at least two augers,
   wherein longitudinal axes of the at least two augers are positioned along a curve, wherein a central axis of the curve is either coincident with or adjacent to a longitudinal axis of the threshing rotor,
   wherein the lower wall, which directly interconnects and extends between the two side walls, extends along a second curve, wherein a central axis of the second curve is either coincident with or adjacent to a longitudinal axis of the threshing rotor.

2. The agricultural harvester of claim 1, wherein the lower wall does not extend to an elevation above the at least two augers, and the side walls extend to an elevation either at or above longitudinal axes of the at least two augers.

3. The agricultural harvester of claim 1, wherein the bed comprises another trough that is positioned adjacent said trough, wherein a sidewall of said another trough is connected to one of the two side walls of said trough.

4. The agricultural harvester of claim 1, wherein the longitudinal axes of the at least two augers are spaced apart by a distance that is less than an outer diameter of one of the at least two augers.

5. The agricultural harvester of claim 1, wherein longitudinal axes of the two augers are spaced apart by a distance that is greater than an outer diameter of one of the two augers.

6. The agricultural harvester of claim 1 further comprising a grain bed positioned at an exit of the auger bed.

* * * * *